B. J. PIKE.
PEANUT SHELLER.
APPLICATION FILED JUNE 23, 1917.
1,264,329.
Patented Apr. 30, 1918.
2 SHEETS—SHEET 1.
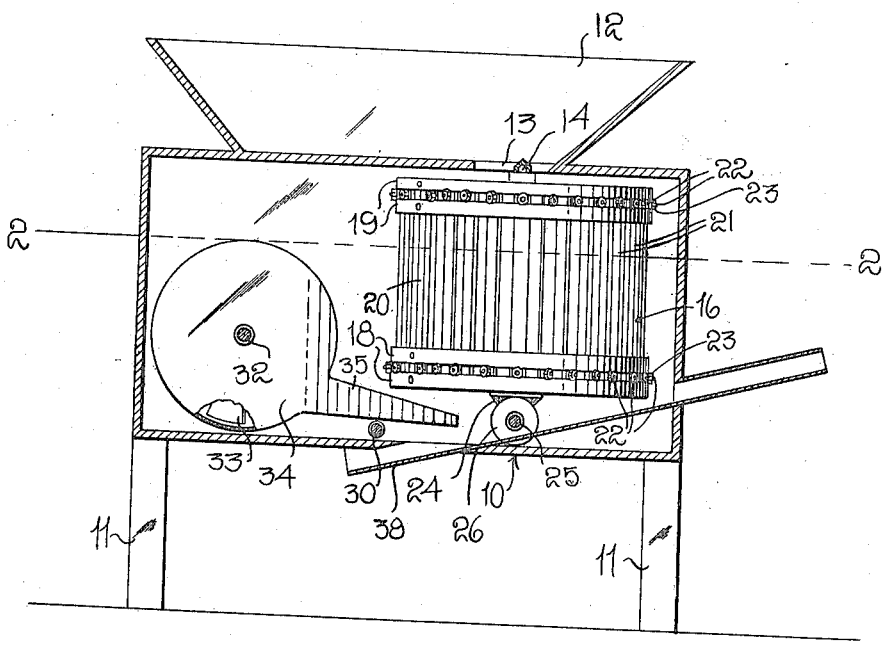
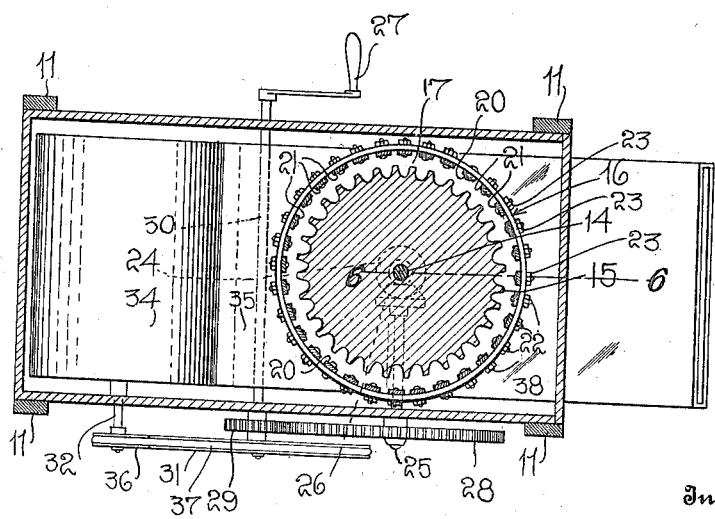
Inventor
BENJAMIN J. PIKE
By Watson E. Coleman
Attorney B. J. PIKE.
PEANUT SHELLER.
APPLICATION FILED JUNE 23, 1917.
1,264,329.
Patented Apr. 30, 1918.
2 SHEETS—SHEET 2.
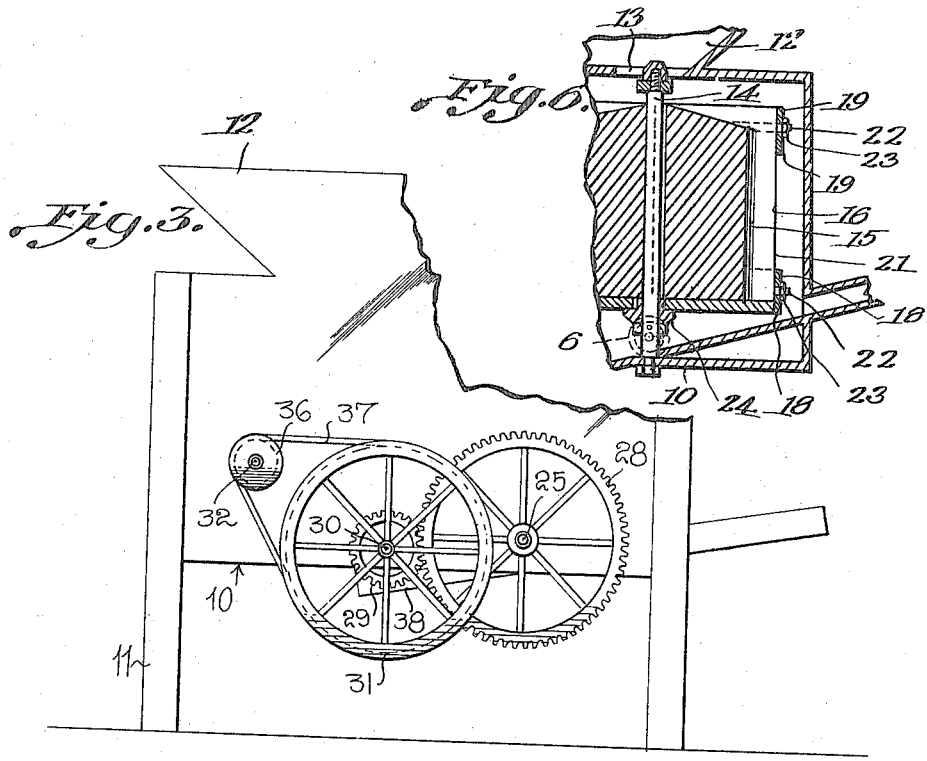
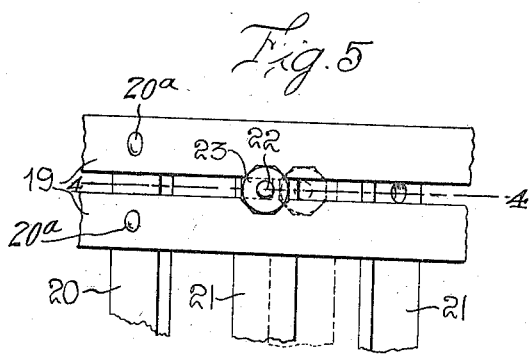
Inventor
BENJAMIN J. PIKE
By Watson E. Coleman
Attorney

UNITED STATES PATENT OFFICE.

BENJAMIN J. PIKE, OF MAUK, GEORGIA.

PEANUT-SHELLER.

1,264,329.

Specification of Letters Patent.

Patented Apr. 30, 1918.

Application filed June 23, 1917. Serial No. 176,613.

*To all whom it may concern:*

Be it known that BENJAMIN J. PIKE, a citizen of the United States, residing at Mauk, in the county of Taylor and State of Georgia, has invented certain new and useful Improvements in Peanut-Shellers, of which the following is a specification, reference being had to the accompanying drawings.

This invention relates to peanut shelling machines, and the general object of the invention is the provision of a very simple and effective machine for this purpose.

A further object is to provide a cylinder coacting with a ribbed drum, the cylinder having a plurality of evenly spaced bars, the bars being adjustable so as to shell peanuts of different sizes.

A further object of the invention is the provision of a vertically disposed ribbed drum and a vertically disposed cylinder within which the ribbed drum is disposed, and provide means for rotating the cylinder around the ribbed drum, the cylinder and drum being disposed vertically so that the nuts will feed downward and be discharged onto a chute and provide in connection with the chute, means whereby the chaff or hulls may be blown away from the shelled nuts or kernels.

Other objects will appear in the course of the following description.

My invention is illustrated in the accompanying drawings, wherein:—

Figure 1 is a vertical section through a peanut shelling machine constructed in accordance with my invention, the shelling drum being in elevation and the blower casing being partly broken away;

Fig. 2 is a section on the line 2—2 of Fig. 1;

Fig. 3 is a side elevation of the peanut sheller;

Fig. 4 is a fragmentary enlarged section on the line 4—4 of Fig. 5;

Fig. 5 is a fragmentary elevation of the upper portion of the shelling drum.

Fig. 6 is a fragmentary vertical sectional view on the line 6—6 of Fig. 2.

Referring to these drawings, 10 designates a supporting frame of any suitable construction and having legs 11. Disposed above the frame is the hopper 12, the bottom of which is formed with an opening 13. Disposed within the frame, upon a fixed shaft 14, is a vertically ribbed drum 15, which, as before remarked, is fixed from rotation by being keyed on the fixed shaft. Surrounding the drum 15 and rotatable upon the shaft is a cylinder 16. This cylinder comprises a base 17, a lower pair of spaced bands 18, and an upper pair of spaced bands 19. The upper pair of spaced bands 19 are held in spaced relation to each other and in spaced relation to the lower bands 18 by means of certain vertically disposed bars 20, which are riveted to the bands 18 and 19 upon the inner face thereof as at 20$^a$. Only two of these supporting bars 20 are necessary, though more than this number may be used if desired.

Disposed upon the inner faces of the bands 18 and 19 are a plurality of bars 21, which have the same thickness and the same width as the bars 20, but they are adjustably mounted upon the bands 18 and 19 by means of small bolts 22, which pass between the bars 19 and between the bars 18, nuts 23 on these bolts acting to clamp and hold the bars 21 in place. By removing these nuts and bolts, it is obvious that the bars 21 may be removed and that by slackening up on these nuts that the bars 21 may be spaced a greater or less distance from each other thus arranging the bars to suit the size of peanuts which are to be shelled or hulled. The shaft 14 is fixed from rotation but the cylinder 16 formed of the bars 20 and 21 is intended to be rotated and to this end the base or bottom of the cylinder 17 is provided with a beveled gear wheel 24, which may be supported on the shaft in any suitable manner as by means of a collar held to the shaft and upon which the beveled gear wheel rests and rotates, said beveled gear wheel in turn supporting the cylinder 16 and being attached thereto. Extending transversely across the frame 10 is a shaft 25, which carries a gear wheel 26, which meshes with the gear wheel 24. This shaft 25 carries upon it a crank handle 27 whereby the shaft may be rotated. Mounted upon the shaft 25 is a gear wheel 28, which meshes with a gear wheel 29 mounted upon a stub shaft 30, this shaft carrying a band wheel 31.

Mounted in suitable bearings in the casing 10 is a fan shaft 32 carrying upon it the fan 33, this fan being disposed within a blower casing 34 having a discharge nozzle 35 which extends to a point beneath the cylinder 16. This fan shaft 32 carries upon it the band wheel 36 over which a band 37 passes from the band wheel 31. Extending down at an inclination below the cylinder 16 and receiving the peanuts therefrom is a chute 38 and the fan nozzle 35 discharges onto this chute. The chute extends upward through the frame and downward and the fan nozzle under these circumstances will blow out the trash, hulls, etc., while permitting the kernels of the peanuts to roll downward on the chute and be discharged into any suitable receptacle.

It will be seen that this construction is very simple, readily operated and that it has been found thoroughly effective in practice, much more so than were the ribbed drum 15 and the cylinder 16 to be arranged in a horizontal plane. A construction of this character permits the shells of the nuts to be broken, without however crushing the kernel and I have found that it feeds and discharges much faster than where the cylinder and drum are arranged for rotation in a horizontal plane. It will be noted that the peanuts are carried around the cylinder with the drum in a spiral course and eventually discharged from the bottom of the cylinder. It will be seen that when it is desired to adjust the bars 21 so as to adjust the spaces between the bars, one or more of the bars 21 may be removed and the remainder of the bars adjusted so as to provide equal spaces between the bars. The fewer bars there are used, the wider will be the spaces between the bars.

Having described my invention, what I claim is:—

1. A nut shelling device including a centrally disposed, vertically corrugated drum held from rotation, an outer cylinder surrounding the drum and disposed concentrically thereto and including a plurality of vertically disposed bars, certain of said bars being mounted for adjustment toward or from each other, and means for rotating the outer cylinder with respect to said drum.

2. A nut shelling device comprising a cylinder having a bottom, upper and lower pairs of vertically spaced circular bands, supporting bars connected to the bottom and to said bands and holding the upper bands in spaced relation to the lower bands, a plurality of vertically disposed bars mounted on the inner faces of said pairs of bands, bolts passing between the upper pairs of bands and the lower pairs of bands, the said last named bars being thereby adjustable toward or from each other, a drum disposed within the cylinder and having longitudinally extending peripheral corrugations, and means for relatively rotating the cylinder and the drum.

In testimony whereof I hereunto affix my signature in the presence of two witnesses.

BENJAMIN J. PIKE.

Witnesses:
W. A. WOODALL,
R. M. JINKS.

Copies of this patent may be obtained for five cents each, by addressing the "Commissioner of Patents Washington, D. C."